United States Patent [19]
Schubert

[11] 4,066,341
[45] Jan. 3, 1978

[54] SCANNER ALIGNMENT MECHANISM

[75] Inventor: Alvin Louis Schubert, Rochester, N.Y.

[73] Assignee: Eastman Kodak Company, Rochester, N.Y.

[21] Appl. No.: 690,480

[22] Filed: May 27, 1976

[51] Int. Cl.² ............................................ G05D 25/00
[52] U.S. Cl. ...................................... 350/285; 350/7; 358/199
[58] Field of Search ................. 350/6, 7, 33, 252, 285, 350/85, 256; 230/236, 237; 351/13

[56] References Cited

U.S. PATENT DOCUMENTS

| | | | |
|---|---|---|---|
| 2,616,335 | 11/1952 | Mazur | 350/281 |
| 3,155,761 | 11/1964 | Rubens et al. | 350/285 |
| 3,360,659 | 12/1967 | Young | 350/7 |
| 3,560,080 | 2/1971 | Wilczynski et al. | 350/252 |
| 3,588,230 | 6/1971 | De Rieux | 350/285 |
| 3,790,246 | 2/1974 | Pickering | 350/285 |
| 3,888,568 | 6/1975 | Norris et al. | 350/282 |

Primary Examiner—John K. Corbin
Attorney, Agent, or Firm—D. R. Arndt

[57] ABSTRACT

The mechanism for adjusting an axis of a mirror or other optical element comprises three major parts; i.e., a rotational mount, a mirror normal mount and a mirror plane mount. Relative motion of the rotational and normal mounts about a mutual cylindrical axis provides adjustment of the scanner axis in a plane containing the scanner axis and in a direction normal to the mirror. In a similar fashion, relative motion of the normal and plane mounts about a second mutual cylindrical axis provides adjustment of the scanner axis in a plane containing the scanner axis and in a direction parallel to the mirror surface. Careful control of the relative motions mentioned above allows for the independent adjustment of the scanner axis in the mirror plane and mirror normal plane about the center of the scanner mirror. This mechanism when used with each of a pair of mirrors facilitates the alignment of X-Y scanner axes to obtain "character splitting" in COM imagery by allowing minute and independent adjustment of either scanner axis with no mirror translation; thereby insuring perpendicular scanning.

2 Claims, 5 Drawing Figures

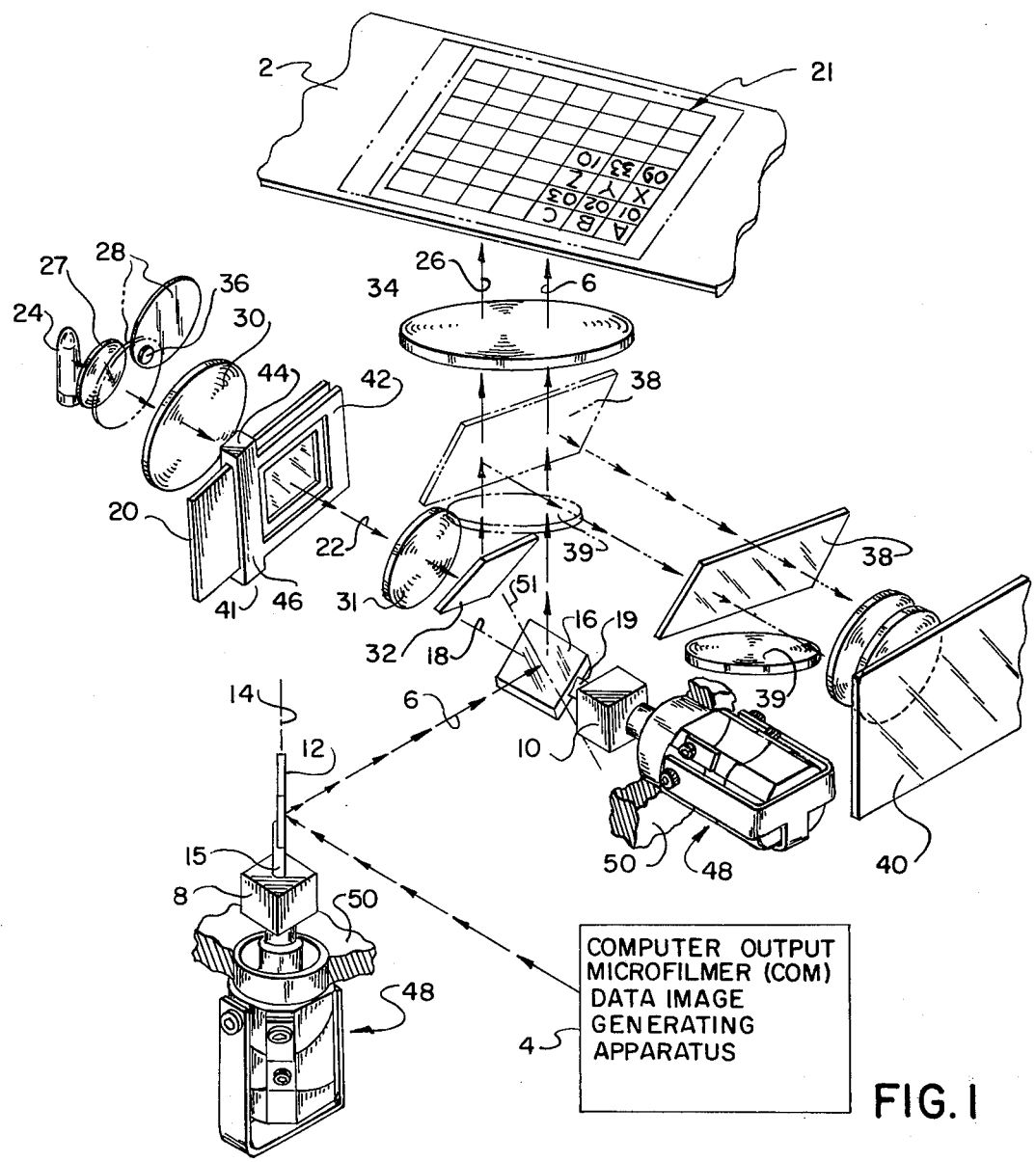
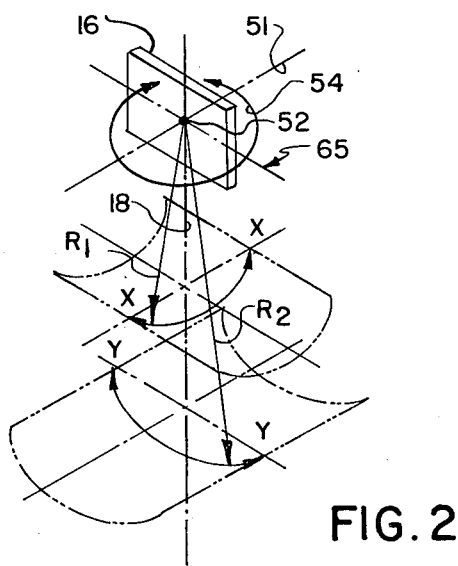
FIG. 1
FIG. 2

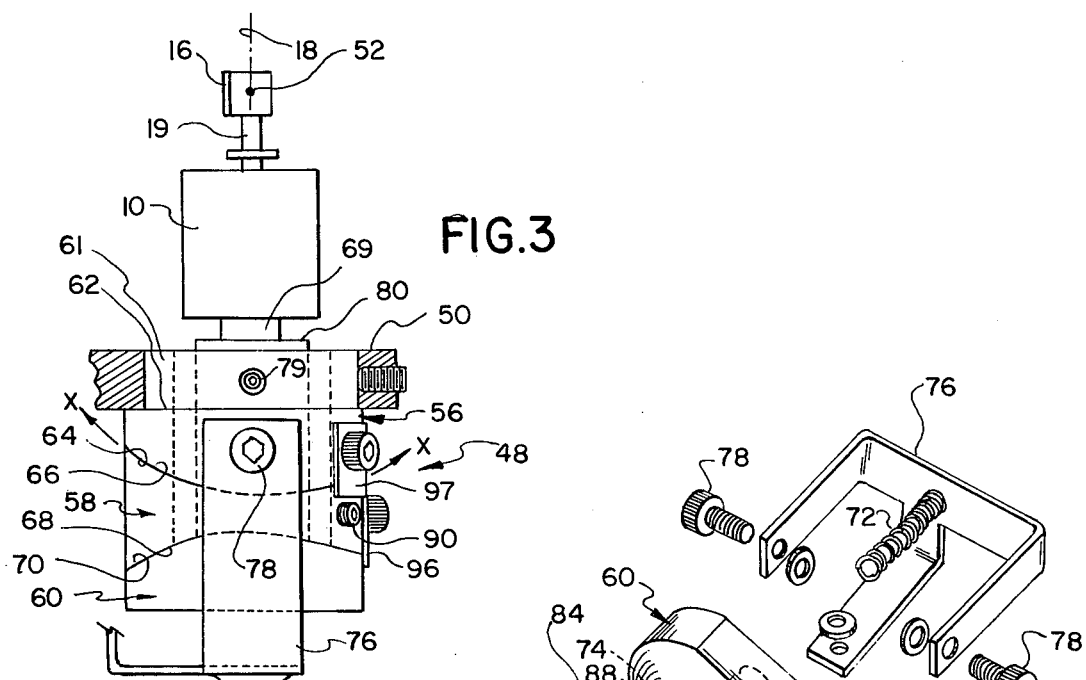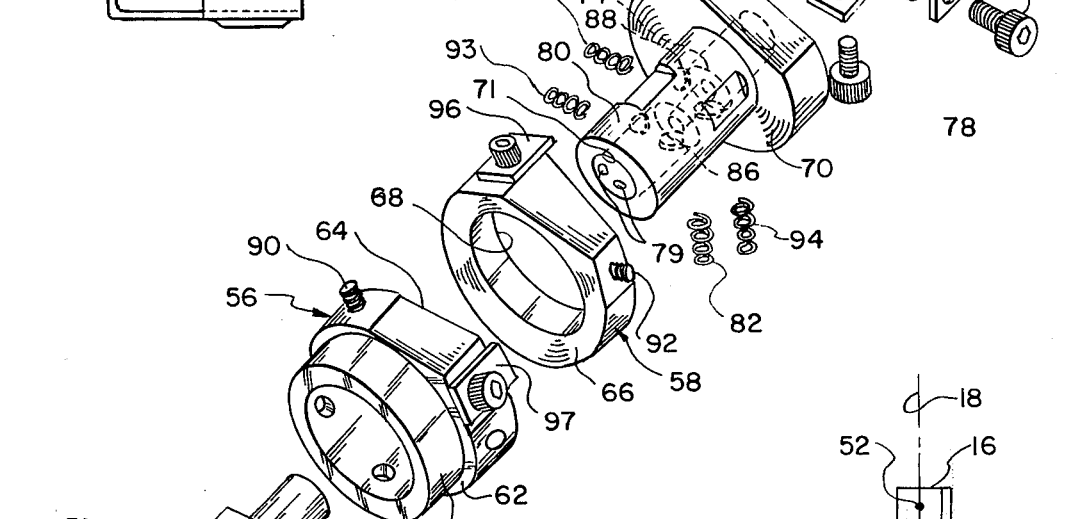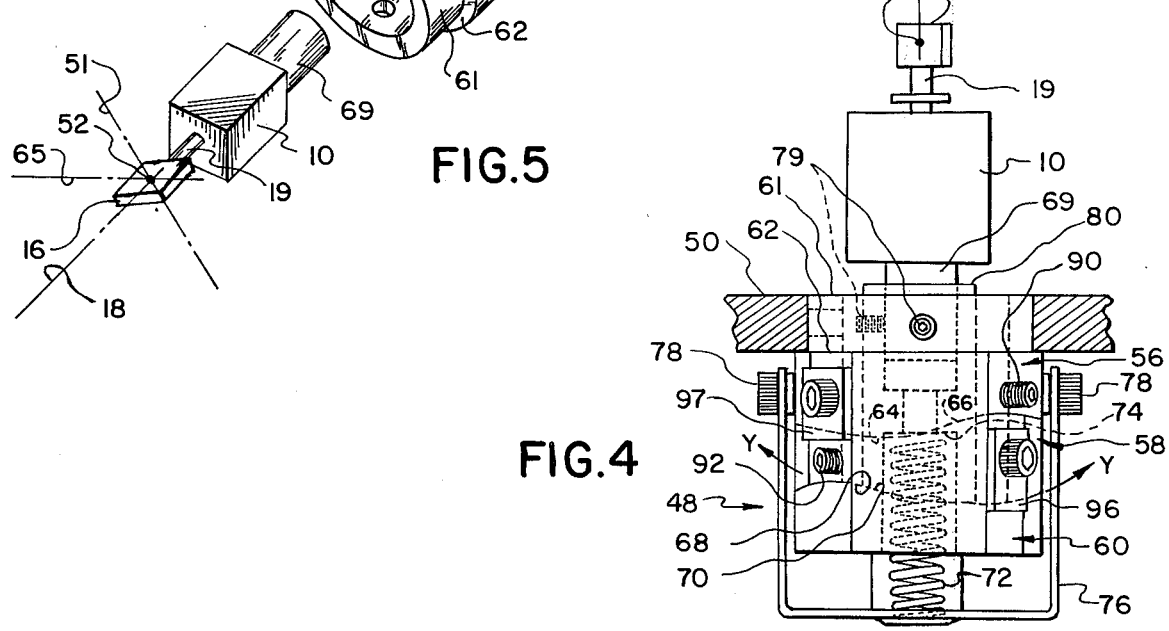

SCANNER ALIGNMENT MECHANISM

BACKGROUND OF THE INVENTION

1. Field of the Invention

The present invention relates to apparatus for aligning X-Y scanner axes to register a light image with respect to a form slide on an image receiving member.

The invention is especially suitable for use in computer output microfilmers (COM) wherein successive lines of alphanumeric characters are scanned across a film to record a page of computer output data. The invention is generally applicable for use in mirror scanning apparatus wherein beams of light are reflected off nutating mirrors for providing images with a high degree of accuracy and resolution.

This type of accurate registration is referred to as "character splitting" in COM units and means that, everywhere over the film image, form slide lines will appear inbetween adjacent characters without touching them. The mechanism for achieving this accuracy and resolution is an image generator system whose optical and mechanical components are carefully toleranced and, when assembled, are aligned according to a rigorous and well planned alignment procedure. The present invention facilitates such an alignment procedure by allowing minute and independent adjustment of the scanner axis for each mirror with no mirror translation; thereby insuring perpendicular scanning.

2. Description of The Prior Art

In the computer output microfilmers, computer data can be converted into light beams which are scanned on to a a film for recording the alphanumeric characters which represent the computer data. It has beem found desirable to use a mirror which is controlled by a galvanometer for scanning the light beams to write a line of characters on the film. Successive lines may be written by advancing the film. However, in the interest of increasing writing speed and accuracy, it is desirable to use a second galvanometer rotated mirror to scan the beams in a direction perpendicular to the direction of the lines; thus permitting a complete page of computer output data to be written, said in one frame of the film.

In the course of microfilming operations, it is necessary to record on the film pages of very small size and for this reason misalignment of the mirrors cannot be tolerated. Proper alignment of the mirrors is requisite to providing parallelism of the characters with respect to one another as well as with format lines superimposed from a form slide. For example, if the displayed data has shifted vertically downward by one or two lines this may indicate that the mirror has been dislodged out of its proper plane such that the mirror top has physically moved towards the page; thus adjustment of the scanner axis will be required to properly position the characters.

In the past, different techniques have been utilized to accomplish this adjustment such as physically repositioning the mirror on the shaft of the galvanometer. However, because the adjusting mechanism itself was located on the shaft of the mirror the mass that the galvanometer had to rotate was increased significantly, resulting in over-shoot problems because of the increased inertia.

In an effort to reduce the mass that the galvanometer must rotate, an adjustable base was provided in which the galvanometer was mounted. Thus, by adjusting the mount which supports the galvanometer the mirror could be repositioned.

Some of these earlier mounts utilized shim arrangements to adjust the position of the scanner axis. However, when this type of mount was used, it was found that the center of the mirror was displaced, as a result of the adjustment, which introduced undesirable distortion.

Another type of mount that was utilized was a ball and socket arrangement. The galvanometer was mounted on a shelf which terminated in a spherical portion which engaged a complementary concave base unit. Nylon tipped screws were provided in the spherical portion to slidably adjust the position of the spherical surface in the socket which in turn adjusted the axis of the scanner.

It was found that this type of mount allowed the center of the mirror to remain fixed when the scanner axis was adjusted. However, it was also found to complicate the alignment procedure since it did not allow independent adjustment of the axes. Any adjustment in the mirror plane affected the alighment in the mirror normal plane and visa versa.

SUMMARY OF THE INVENTION

It is an object of the present invention to achieve a precise and independent adjustment of a scanner axis with no translation of the mirror center thereby insuring perpendicular scanning of the mirror with respect to an optical path.

Another object of this invention is to obtain precise alignment and registration of computer generated data with respect to an image producing element such as a form slide. A further object of the invention is to effect minute adjustment of image position which is produced by associated imaging apparatus, such as the computer output images generated in a COM, with respect to the superimposed image of a form slide.

It is therefore an object of the present invention to provide improved scanner alignment apparatus for use with electro-optical reflectors in which distortion, introduced by optical relationships of the reflectors, light source and image plane is reduced.

It is a further object of the present invention to provide improved alignment apparatus that will enable minute and independent adjustment of the galvanometer axis to obtain "character splitting" in COM imaging and in addition reduce distortion in the display caused by the relationships of the optical scanning elements.

In accordance with the present invention, a mechanism is provided for effecting alignment of an axis of a planar mirror or other optical element in first and second perpendicular planes. The mechanism includes a first mounting member which is adapted to be secured in a fixed position. This mounting member has a generally cylindrical end surface on one end thereof which is generated about a first axis. A second mounting member has a first generally cylindrical end surface which is slidably engageable in a mating relationship with, and substantially conforms to, the end surface of the first mounting member. The second mounting member also has a second generally cylindrical end surface which is generated about a second axis substantially perpendicular to and intersecting the first axis. A third mounting member has a generally cylindrical end surface which is slidably engageable in a mating relationship with, and substantially conforms to, the second end surface of the second mounting member. Therefore, each of the mounting members is slidably adjustable with respect to the adjacent engaged mounting member along the engaged cylindrical surfaces. Thus the axis of the optical element can be aligned in a first plane by effecting relative movement between the first and second mounting members. Also, the optical element can be aligned in a second plane perpendicular to the first plane by effecting relative movement between the second and third mounting members.

The foregoing and other objects and advantages of the present invention will become more apparent from a reading of the preferred embodiment of the invention which is set forth hereinafter and shown in the accompanying drawings.

BRIEF DESCRIPTION OF THE DRAWINGS

In the detailed description of the preferred embodiment of the invention presented below, reference is made to the accompanying drawings.

FIG. 1 is a diagrammatic view of computer output microfilmer apparatus embodying the invention;

FIG. 2 is a simplified diagram illustrating schematically mirror movement as well as axis positions in the mirror plane Y—Y and mirror normal plane X—X for an optical element such as the line scanning mirror;

FIG. 3 is a side elevational view in greater detail of the adjustable mount with the line galvanometer and mirror mounted thereon;

FIG. 4 is a front elevational view of the device illustrated in FIG. 3; and

FIG. 5 is an exploded perspective view of the adjustable mount.

DESCRIPTION OF THE PREFERRED EMBODIMENT

Referring to FIG. 1, there is shown in diagrammatic form, a computer output microfilmer for producing microfilm records of information from the data source on a photosensitive material such as a photographic recording medium provided by a film 2. The computer output microfilmer may be operated on line in which case the data source may be a computer, such as an IBM 360/370 System which is equipped with interface circuitry for coupling the computer to the computer output microfilmer data image generating apparatus 4. Reference may be had to the following United States Patents for further information respecting suitable interface circuitry: U.S. Pat. Nos. 3,303,476; 3,336,582; and 3,337.310. The computer output microfilmer may also be operated off line in which case the data source may be a magnetic tape station which provides the data to the apparatus 4 through a suitable interface. The film 2 may suitably be a photothermographic material which is sensitive to laser light from a laser contained in the data image generating apparatus 4. This photothermographic material may be processed on a drum-type processor and a temperature in a range of 80° to 170° C with a processing time varying from 2 seconds to about 15 seconds. Exemplary photothermographic material which may be used for the film 2 are described in the following U.S. Pat. Nos. 3,506,444; 3,457,075; and 3,672,904.

Briefly, data is converted into data imaging light rays 6 which are scanned by oscillating galvanometers 8 and 10 to write lines of characters, either numerals or letters, in an image area on the film 2. The light beams are scanned in a horizontal direction to write lines of characters across the recording medium by a reflector, such as a scanning mirror 16, which is mounted for oscillation about a scanner axis 18. Successive lines are recorded on the film 2 by scanning the light beams 6 in a vertical direction (viz., between successive lines) by means of another reflector which is a scanning mirror 12. The mirror 12 is mounted for oscillation about a scanner axis 14, the direction of the lines which are scanned on the film 2 are perpendicular to the direction between successive lines. A plurality of successive lines make up a page. The mirror 16 is scanning the line and therefore referred to as a line mirror while the mirror 12 which scans the direction between the lines is referred to as a page mirror 12. The page mirror 12 is nutated about its axis 14 by a galvanometer 8 which is mechanically coupled to the mirror by a shaft 15. A similar galvanometer 10 is mechanically coupled via shaft 19 to the line mirror 16 to rotate it about its axis 18. The line galvanometer 10 is driven continuously back and forth or nutated while the COM is in a writing mode. The page scanner galvanometer 8 steps and pauses while each line is scanned, and then it sweeps back to the top of the page position. Reference may be had to U.S. Pat. No. 3,624,574 for further information respecting galvanometers suitable for rotating the scanning mirrors 12 and 16.

Each page may be a single frame. Between recording of each frame the recording medium 2 may be repositioned to generate fiche (not shown) or advanced by reeling devices (not shown). The film may suitably be 105mm film when microfiche records are desired. Alternatively, the film may be 16mm film which is utilized for roll film application. In practice, it has been found desirable to superimpose an image of a business form which is in register with the image of the computer generated data. The minute dimensions of the characters require precision location of the form image so as to register it with respect to the computer data image in the image area.

This form image, which is illustrated as a grid 21, by way of example, is carried on a business form slide 20. Optics are provided for projecting light along optical path 22 or axis which extends between a source of illumination 24 illustrated as a lamp and the film 2. The form imaging rays are projected along a portion of a path 26 which is coincident with a part of the path along which the data imaging rays travel to the film 2. In other words, the optical path or axis of the computer generated images and the portion 26 of the path of the form images are passed through the same objective lens 34 to create two images superimposed on a film 2.

The optics associated with the form slide 20 includes a lamp 24, a magnification lens 27, a shutter 28, a condenser lens with filter 30, a columnating lens 31, a mirror 32 and an objective lens 34. The objective lens 34 serves to image both the form and the data images on the image area of the film 2. The shutter 28 is rotatable on an axis 36 which opens the path 22 to record the form image at the same time the computer generated data is projected on the film 2. The shutter 28 may be synchronized to the film transport so as to open the path 22 after the film is properly positioned in the film gate. A movable viewing mirror 38 and lens 39 is moved or pivoted out of the paths 26 and 6 when the film is being exposed. A viewer screen 40, such as a ground glass or coated plastic, is used to facilitate the adjustment of the position of the form slide 20. The same image that would appear on the film 2 will be seen on the viewing screen 40 when the mirror 38 is in position. By adjusting the position of the form slide 20, the format lines (the lines in the grid) will be observed so that they can be positioned between adjacent characters and adjacent lines of characters as shown in FIG. 1.

Form slide 20 is received and captured in a flexural retainer 41. This retainer 41 comprises a retainer assembly 42 and is illustrated as including apertured plate 46 having fingers 44 at one end thereof into which the form slide 20 is inserted until the slide is disposed in the aperture retainer assembly 41.

In accordance with the present invention, the line galvanometer 10 is supported in an adjustable mount assembly 48 which in turn is rigidly mounted to a frame 50. In the following detailed description of mount assembly 48, reference will be made to galvanometer 10, it being understood however that the same mount structure can be used for galvanometer 8. In this description reference is made to two mutually perpendicular planes designated in FIG. 2 as planes X—X and Y—Y. The plane Y—Y comprises the plane of the mirror 16. The plane X—X is perpendicular to plane Y—Y and passes through the center of gravity 52 of the mirror. Thus plane X—X is the mirror normal plane and the plane Y—Y is the mirror plane. Use of the adjustable mount assembly 48 allows independent adjustment of the scanner axis 18 in the mirror plane Y—Y and mirror normal plane X—X about a reference point. In view of the accuracy required in COM units, it is preferred to use as the reference point the center of gravity 52 of the line scanner mirror or optical element 16. The scanner axis 18 can be adjusted above the center of gravity 52 in the Y—Y plane and the X—X plane. Arrow 54 in FIG. 2 illustrates nutation of optical element 16, which occurs about axis 18. The axis 18 passes through the center of gravity 52 of the optical element.

FIGS. 3, 4 and 5 illustrate the line scanner adjustable mount assembly 48 in greater detail and shows the galvanometer 10, shaft 19 and mirror 16 as they are carried by the mount assembly 48. The adjustable mount comprises three major parts: a rotational mount 56, a mirror normal mount 58 and a mirror plane mount 60. The rotational mount 56 is generally annular in shape and has a stepped end portion comprising a cylindrical portion 61 that terminates at a shoulder 62. Portion 61 is adapted to fit into a bore in a frame or mechanism plate 50 so that the shoulder 62 abuts the mechanism plate 50. This arrangement allows adjustment of the mount about the axis 18 to establish the mechanical zero (at-rest position) of the scan. The lower portion of the rotational mount 56 has a convex cylindrical end surface 64 whose axis 65 (FIGS. 2 and 5) is through the center of gravity 52 of the scanner mirror 16 while being parallel to the plane of the mirror 16 and perpendicular to the scanner axis 14.

The normal mount 58 also is generally annular in shape and it has a corresponding mating concave cylindrical end surface 66 engageable with end surface 64 of the rotational mount 56. Surfaces 64 and 66 have substantially the same axis 65 and radius of curvature $R_1$. The other end of the normal mount 58 has a convex cylindrical end surface 68 having an axis 51 through the center of gravity 52 of the mirror 16. Axis 51 is perpendicular to both the surface of the mirror 16 and the scanner axis 18. Axis 51 also is perpendicular to axis 65. The plane mount 60 also has a concave cylindrical surface 70 engageable with end surface 68 of the normal mount. Surfaces 68 and 70 have substantially the same axis 51 and the same radius of curvature $R_2$. Mount 60 has a generally cylindrical passageway 71.

Mounts 56 and 60 are held in assembly relation by a retainer 76 which is attached to mount 56 by screws 78, and by a retainer spring 72 that is compressed between plane mount 60 and retainer 76, thereby exerting a force against the mounts that is effective to hold them in their assembled relation. The spring 72 is aligned with the scanner axis with one end in engagement with a seat 74 in the passageway 71 of plane mount 60. The other end of the spring 72 reacts against retainer 76 which is attached to the rotational mount 56 by machine screws 78.

The plane mount 60, as best illustrated in FIG. 5, has a mounting shaft 80 which extends axially through the central openings of both the normal mount 58 and rotational mount 56. Return springs 82 and 84, the axes of which form right angles with each other, are seated in spring pockets 86 and 88, respectively, which are formed in mounting shaft 80. The other end portions of springs 82 and 84 bear against the inner surfaces of mounts 56 and 58, respectively. Thus, return springs 82 and 84 force the mounting shaft 80 against adjustment screws 90 and 92, respectively. Screws 90 and 92 are adjustable in mounts 56 and 58, respectively, and they are positioned at right angles to each other. Similarly, springs 93 and 94, also positioned at right angles to each other, are interposed between shaft 81 and mounts 56 and 58, respectively, to remove radial play of the mounting shaft 80.

Rotation of adjustment screw 92, which acts against return spring 84, causes relative arcuate motion between the normal mount 58 and the plane mount 60 along their engaged surfaces 68 and 70, respectively, about their mutual axis 51. Radial limit member 96 is secured to mount 58 and projects from one end thereof past end surface 68 so that it is engageable by a flat on the cylindrical outer surface of mount 60, thereby limiting the amount of motion that may taken place between the engaged surfaces 68 and 70 in a direction parallel to their mutual axis 51. Thus, member 96 limits the effect of spring 94.

In a similar manner, rotation of adjustment screw 90 which acts against return spring 82, causes relative arcuate motion between the rotational mount 56 and the normal mount 58 along their engaged surfaces 64 and 66, respectively, about their mutual axis 65. Radial limit member 97 is secured to mount 57 and projects from one end thereof past end surface 64 so that it is engageable by a flat on the cylindrical outer surface of mount 58, thereby limiting the amount of motion that may take place between engaged surfaces 64 and 66 in a direction parallel to their mutual axis 65. Thus, member 97 limits the effect of spring 93.

Because the scanner mounting post 69 is rigidly held in passageway 71 by set screws 79, both the mirror 16 and galvanometer 10 act as a rigid extension of mounting shaft 80. Thus, the scanner axis 18 becomes fixed with respect to shaft 80 so that the scanner axis 18 may be adjusted by varying the radial position of the mounting shaft 80 within the mounts 56 and 58. The radial position of shaft 80 within the central portion of the annular mounts 56 and 58 is determined by the adjustment of screws 90 and 92, the interior ends of which bear against mounting shaft 80.

Accordingly, the line scanner axis 18 may be adjusted in two orthogonal directions in order to adjust the data image. The screw adjustments 90 and 92 allow this adjustment of the scanner axis. The mirror can be rotated in its plane by adjustment of screw 92 or tilted directly out of its plane by adjustment of screw 90. These screws are positioned such that if screw 92 is adjusted clockwise, the scanner mirror 16 rotation will appear counterclockwise as viewed in front of the laser reflection surface. A clockwise adjustment of screw 90 will tilt the top edge of the scanner mirror forward out of the mirror plane as viewed from in front of the laser reflection surface.

To insure intimate contact of the engaged cylindrical surfaces, the retainer spring 72 provides a substantial force on the order of about 20 pounds. In addition, the concave cylindrical surfaces 66 and 70 have slightly smaller radii than the corresponding convex surfaces 64 and 68 so that the axial force provided by retainer spring 72 deforms the surfaces into a close fit removing play from the assembly while allowing the movements for mirror adjustment with a decoupling action. Friction between relatively movable surfaces in this assembly is reduced by using good surface finish, hardened steel screws and pressure pads along with a lubricating finish containing molybdenum disulfide.

While the adjustable mount has been described in detail in conjunction with the line scanning mirror 12, the same mount and adjustment sequence is applicable to the adjustment of the page scanning mirror 16 or any similar optical element.

It should be noted that a 90° rotation of the mirror 16 about axis 18 to include axis 51 in the plane of the mirror interchanges the function of the adjustment screws 90 and 92. The orientation of the mirror with respect to the mounts illustrated in FIG. 1 differs from the orientation shown in FIGS. 3, 4 and 5 by 90° and was done for illustrative convenience.

From the foregoing description, it will be apparent that there has been provided an improved alignment mechanism which is especially suitable for alignment of scanner axes of galvanometer mirrors in computer output microfilmers. While a preferred embodiment of the apparatus has been described, it will be appreciated that other variations and modifications within the scope of the invention will undoubtedly suggest themselves to those skilled in the art. Accordingly, the foregoing description should be taken merely as illustrative and not in any limiting sense.

I claim:

1. A mechanism for effecting alignment of an axis of a mirror or other optical element in first and second perpendicular planes, the mechanism comprising:

A first mounting member adapted to be secured in a fixed position, the mounting member having at an end thereof a generally cylindrical end surface generated about a first axis;

a second mounting member having a first generally cylindrical end surface slidably engageable in a mating relationship with, and substantially conforming to, the end surface of the first mounting member, the second mounting member having a second generally cylindrical end surface generated about a second axis substantially perpendicular to the first axis, the first and second axes intersecting each other;

a third mounting member having a generally cylindrical end surface slidably engageable in a mating relationship with, and substantially conforming to, the second end surface of the second mounting member whereby each of said mounting members is slidably adjustable with respect to the adjacent mounting member along the engaged cylindrical surfaces; and means for supporting the optical element on the third mounting member with its axis perpendicular to and intersecting said first and second axes so that the axis of the optical element can be aligned in a first plane by effecting relative movement between said first and second mounting members and the optical element can be aligned in a second plane perpendicular to said first plane by effecting relative movement between said second and third mounting members.

2. A mechanism for aligning a mirror or other optical element comprising:

a first annular member adapted to be rigidly mounted to a support;

a second annular member axially aligned with said first annular member;

a mounting member axially aligned with said first and second members and including a mounting shaft which extends axially through said first and second members;

means associated with said members for urging a surface and said mounting member into engagement with a surface of said second member while urging a surface of said second member into engagement with a surface of said first member;

the engaged surfaces of said first member and said second member forming an arcuate portion of a cylinder having a longitudinal axis which is substantially perpendicular to said first direction;

the engaged surfaces of said mounting member and said second member forming an arcuate portion of a cylinder having a longitudinal axis which is substantially perpendicular to said second direction;

means associated with said first member for adjusting the radial position of said mounting shaft within said first member in a first direction;

means associated with said second member for adjusting the radial position of said mounting shaft within said second member in a second direction orthogonal to said first direction.

* * * * *